Patented July 1, 1941

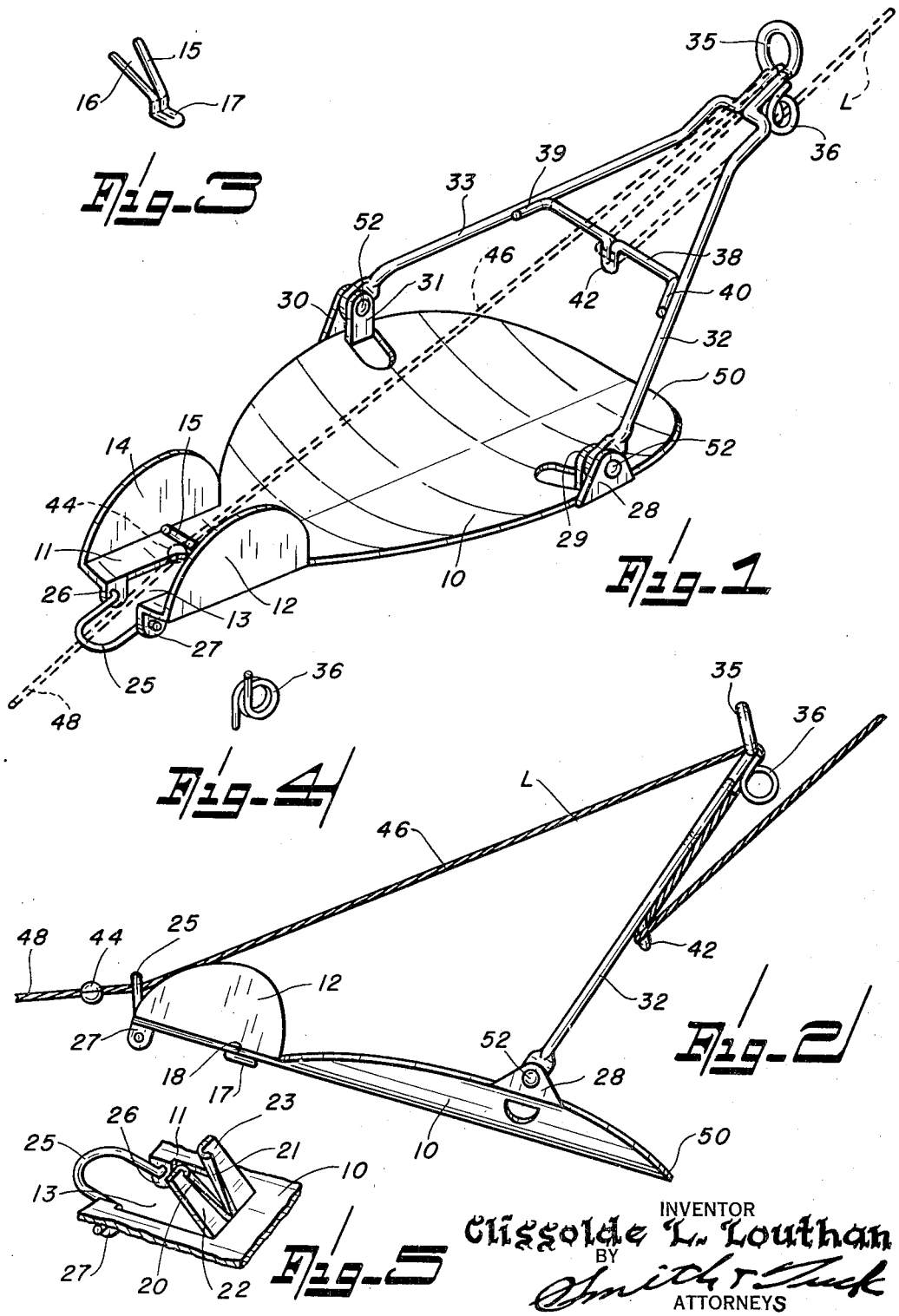

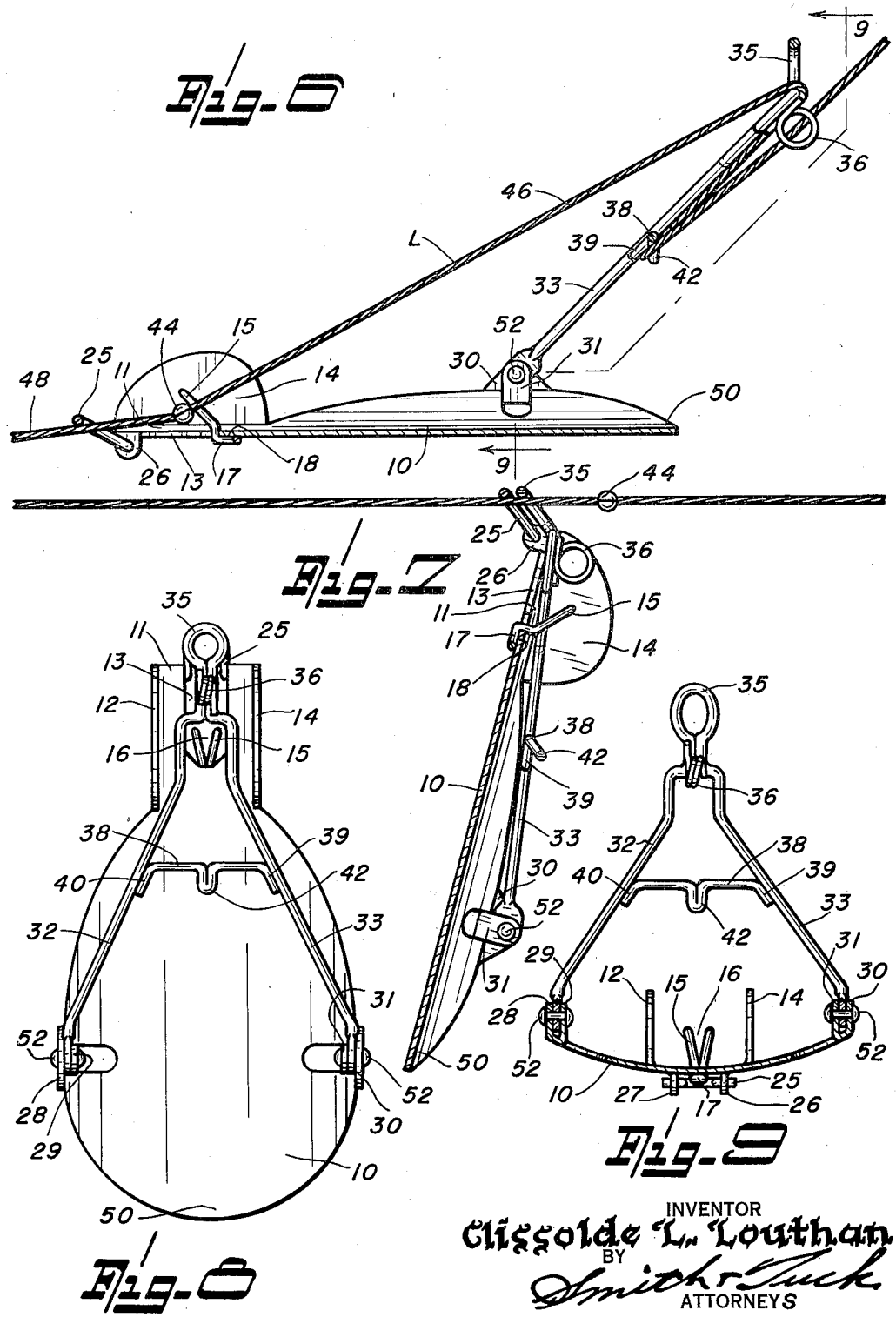

2,247,583

UNITED STATES PATENT OFFICE 2,247,583

KITELIKE TROLLING SINKER

Clissolde L. Louthan, Seattle, Wash., assignor of fifty per cent to Mary Elizabeth Henry, Lakeside, Wash.

Application March 11, 1940, Serial No. 323,339

14 Claims. (Cl. 43—52)

My present invention relates to the general art of fishing tackle, and more particularly to a kite-like trolling sinker.

My device is formed with a kite-like body which is curved about its longitudinal axis so as to provide a water impinging surface of considerable area; and it is provided with a pivoted line-securing means so arranged that, when a fish strikes a lure secured behind the sinker, the pull on the line, incidental to the strike, will release the forward line-securing means and permit the sinker to fold up in a manner so that it will no longer have a kiting action but will slide down the line to the lure.

In trolling, particularly ocean trolling, where fishing must be done at considerable depths, it is customary to employ relatively heavy lead sinkers. In fact, in the commercial trolling field, lead weights weighing up to 80 pounds are often so employed. The sole purpose of the lead weights is to carry the line down to the depth where fish can be found. The towing of the heavy weights, which are required when a number of lures are attached to a fishing line, places an unusual strain on the whole line of tackle so that it must be very rugged. This ruggedness calls for bulk and weight which makes it impossible, in commercial use, to employ hand means for reeling in of the line. In the field of sports fishing, it again is necessary to have sinkers that will carry the line down to considerable depth; and when a fish strikes a heavily weighted line, the weight so handicaps the angler that landing the fish is difficult and the fish does not have a chance to play, thus detracting from the sportsman's maximum enjoyment of the sport.

My present folding sinker is designed to overcome this condition, and provides a lightweight means that will serve the same purposes as the heavy sinker and yet, after the line is struck, will not interfere with the playing of the fish.

The principal object of my invention, therefore, is to provide a kite-like sinker so arranged that it will fold when a fish strikes and thus not affect the line or the fish during the ensuing period of playing the fish.

A further object of my invention is to provide a kite-like sinker which will have the capacity of reversing itself if a large amount of weeds or the like should be caught on the forward end of the sinker, and after reversing itself and unloading the weeds, the sinker will fold back into its normal fishing position.

Another object of my invention is to provide a fishing sinker so arranged that when a fish strikes the bait it will fold and slide down the line to the lure.

A further object of my invention is to so shape the kite surface, and to so form the bridle arrangement that my sinker will carry the line down to any predetermined depth without regard to the speed of the boat, and will hold to a given depth as long as the length of the line employed between the sinker and the boat is not changed.

Still another object of my invention is to so fashion the kiting surface of my sinker that it will at all times travel in a straight line and will not sway or wobble from side to side, thus permitting the use of a plurality of such devices from the same boat with but short distances separating the same.

Other and more specific objects will be apparent from the following description taken in connection with the accompanying drawings wherein Figure 1 is a perspective view of a kite-like sinker made after the teachings of my present invention; in this figure the trolling line is shown in dashed line.

Figure 2 is a side elevation of the sinker of Figure 1 with the sinker in the act of folding, just after a fish has struck the lure, and the line being released from its engaging means.

Figure 3 is a perspective view of one form of rear line stop.

Figure 4 is a perspective view showing the friction line engaging means secured to the apex of my bridle arrangement.

Figure 5 is a fragmentary, perspective view showing the rear end of my sinker with a modified form of line stop.

Figure 6 is a longitudinal, sectional view through my sinker showing the manner in which the trolling line is engaged thereby when in fishing position.

Figure 7 is a longitudinal, sectional view through my fishing sinker after a strike has been experienced and the sinker has folded into its inoperative position.

Figure 8 is a top plan view of my sinker with the bridle arrangement in its folded position.

Figure 9 is a cross-sectional view taken along the line 9—9 of Figure 6.

Referring to the drawings throughout which like reference characters indicate like parts, 10 designates the body of my lure. This may be made of various types of materials such as plastics, or sheet metal. In the form illustrated I have shown the same as though it were made of sheet metal. The body of my device is formed ovate, or egg-shaped, in projected view, with the more rounded portion at the top or leading end of the sinker. The body of the sinker is curved along its longitudinal axis, so that in transverse section it presents substantially a segment of a circle as is probably best illustrated in Figure 9. Near the rear of my sinker body I provide a U-shaped tail extension 11 having two vertically directed rudders, or guide fins, 12 and 14, extending along the outer edges. These fins serve the same general purpose as the vertical rudders of an airpane. They hold the sinker to a straight course as it is pulled through the water, and thus prevent entanglement, particularly where a number of such lines are used in close proximity to each other as when towed from the same boat.

Disposed, preferably between the two vertical fins 12 and 14, and near the forward end of the opening 13 in the U-shaped extension 11, is a line stop member 15. This member may be made after the showing of Figure 3 in which a piece of wire is folded back on itself to provide a V-shaped opening 16, and the foot portion 17, which is secured by welding or soldering it to the body 10 of the sinker as is probably best illustrated in Figures 6 and 7 at 18.

An alternate arrangement is shown in Figure 5 in which the line stop is formed by striking the same from the material forming the extension 11 in forming the opening 13. This provides flat portions 22 and 23 having an intermediate V-shaped opening having the curved divergent marginal portions 20 and 21. The flat portions as 22 and 23 serve, first, to give rigidity to the line stop and, second, as horizontal rudders so that water may impinge upon them and deflect the rear of the sinker when the same tends to rise, particularly as may occur when the lure is used behind the sinker and occasionally strikes bottom.

Disposed rearwardly of the line stop member, and adjacent the rear end of opening 13, is a pivotally mounted bail 25. This is passed through downwardly extending lugs as 26 and 27 formed from the material of body 10. This construction is probably best illustrated in Figures 1 and 5.

Near the maximum width of my sinker body 10, which occurs near the front end thereof, as is best observed from the study of the various views, I provide upwardly extending lugs as 28, 29, 30, and 31. To these lugs are pivotally attached the eyes formed in the opposed legs 32 and 33 of the bridle member. Pivoted mounting is secured by passing rivets through these lugs and through the eyes of the bridle members so that the bridle member will be free to assume the position shown in Figures 1, 2, and 6, yet on occasions may be folded after the showing of Figures 7 and 8. At its upper end or apex, the side members 32 and 33 of the bridle member come together to form the upper loop or eye 35. Eye 35 should be of sufficient size to freely slide over knots in the line or stops secured thereto. Below ring portion 35 the side members abut each other and are normally joined together at this point due to the brazing or soldering thereto of the coiled line-grip 36. At a point substantially midway between its two ends, the A-shaped bridle has a cross-bar 38 which is preferably soldered, brazed, or welded to the bridle at 39 and 40. This cross member is provided with an outstanding, downwardly directed stud 42 which may be either formed of the materials of which the cross member is formed or it may be a separate lug secured thereto.

*Method of operation*

In using my sinker for sports fishing, where normally only one lure or baited hook is used, the line L, as it comes down from the towing boat, is first passed through the loop 35 and then through the bail member 25. The lure is then attached to the end of the line. The line L has at a predetermined distance a knot tied therein, or a ball-like member 44 secured thereto. The knot is next positioned to abut the under side of the V-shaped opening 16 formed in the stop member 15 or the alternate stop arrangement illustrated in Figure 5. The angle of the bridle is then determined, and a bight in the line just ahead of the loop 35 is placed down and around the stud 42 and then upwardly where it is clipped into the coiled frictional engagement member 36. The length of the line L between stop 15 and ring 35 at 46 determines the angle at which the bridle is supported with respect to body 10. This angle, in turn, determines the angle formed between line L, as it leads down from the boat, and the longitudinal axis of the sinker body.

As the sinker is towed in fishing, the water impinging on the upper curved surface of body 10 causes a kiting action that forces the sinker to go downwardly in the water until the longitudinal axis is substantially horizontal, after the showing of Figure 6. When this point is reached, there is, because of the angle between line L and longitudinal axis of body 10, no further force driving the sinker lower. Consequently, for a given length of line L the sinker will maintain itself at an exact depth which may be predetermined as the operator becomes experienced in setting the angle of the bridle with respect to the longitudinal axis of surface 10.

When a fish strikes the lure, its first action as shown in Figure 2 is to pull rearwardly on the portion of the line, indicated at 48, that is in the rear of bail 25. This action frees ball 44 from engagement with the slanting V 15. The bridle is then pulled backward from the ring 35 which disengages the line from the friction line-securing means 36. As there is no longer any support for the bridle, it is then free to pivot back on surface 10. At the same time, the slack in the standing part 46 frees the bight in the line looped under lug 42 so that the sinker folds up in the form illustrated in Figure 7 and is free to slide down the line to the lure and thus in no way interferes with the playing of the fish.

If, in normal fishing the leading end 50 of the sinker should be fouled by weeds or by striking the bottom, the body 10 of the sinker can revolve about rivets 52 until the angle of body 10 is sufficient so that the accumulation on the front end of the same will be unloaded. At that time the action of the sinker is such as to cause it to go immediately back to its fishing position. During this entire time the sharp V of member 15 will have held the line in such a position as to keep ball 44 seated against the under side of member 15. In this way no loss of tackle is experienced, and what is more important, no fishing time is lost.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. A trolling device comprising a body portion provided with a tail extension having a rear U-shaped slot, upstanding longitudinally disposed rudder fins at the rear of said body portion, a line stop member adjacent the forward end of said slot and having a V-shaped opening for engaging an obstacle on a trolling line, a pivoted bail at the rear end of said slot, an A-shaped bridle pivoted adjacent the forward end of said body portion and comprising a pair of converging legs and a cross-bar between said legs, said cross-bar having a depending stud for engagement by a bight in the trolling line, said bridle having an eye at its apex, and friction means associated with said bridle for gripping the standing part of a trolling line.

2. A trolling device comprising a transversely curved ovate body portion provided with a tail extension having a rear U-shaped slot, upstanding longitudinally disposed rudder fins at the rear of said body portion, a line stop member adjacent the forward end of said slot and having a V-shaped opening for engaging an obstacle on a trolling line, a pivoted bail at the rear end of said slot, an A-shaped bridle pivoted adjacent the forward end of said body portion and comprising a pair of converging legs and a cross-bar between said legs, said cross-bar having a depending stud for engagement by a bight in the trolling line, said bridle having an eye at its apex, and friction means associated with said bridle for gripping the standing part of a trolling line.

3. A trolling device comprising a body portion provided with a tail extension having a rear U-shaped slot, a line stop adjacent the forward end of said slot for engaging a stop on a trolling line, a bail adjacent the rear end of the slot, an A-shaped bridle pivoted to said body and comprising a pair of converging legs and a cross-bar between said legs, said bridle having an eye at its apex, line-grip means associated with said bridle, and means on the cross-bar for engaging a bight in the trolling line.

4. A trolling device comprising a body portion provided with a tail extension having a rear U-shaped slot, rudder fins along the edges of the tail extension, a line stop adjacent the forward end of said slot for engaging a stop on a trolling line, a bail adjacent the rear end of the slot, an A-shaped bridle pivoted to said body and comprising a pair of converging legs and a cross-bar between said legs, said bridle having an eye at its apex, line-grip means associated with said bridle, and means on the cross-bar for engaging a bight in the trolling line.

5. A trolling device comprising a transversely curved ovate body portion provided with a tail extension having a rear U-shaped slot, a line stop adjacent the forward end of said slot for engaging a stop on a trolling line, a bail adjacent the rear end of the slot, an A-shaped bridle pivoted to said body and comprising a pair of converging legs and a cross-bar between said legs, said bridle having an eye at its apex, line-grip means associated with said eye on the bridle, and means on the cross-bar for engaging a bight in the trolling line.

6. A trolling device comprising a body portion provided with a tail extension having a rear U-shaped slot, a line stop adjacent the forward end of said slot for engaging a stop on a trolling line, a bail adjacent the rear end of the slot, an A-shaped bridle pivoted to said body and comprising a pair of converging legs and a cross-bar between said legs, said bridle having an eye at its apex, line-grip means associated with said bridle, and a depending stud on the cross-bar for engaging a bight in the trolling line.

7. A trolling device comprising a body portion having a rear U-shaped slot, a line stop adjacent the forward end of said slot for engaging a stop on a trolling line, an A-shaped bridle pivoted to said body and comprising a pair of converging legs and a cross-bar between said legs and having a line-engaging eye at its apex, means on said cross-bar for engaging a bight in the trolling line, and friction line-grip means associated with said bridle.

8. A trolling device comprising a transversely curved ovate body portion having a rear U-shaped slot, a line stop adjacent the forward end of said slot for engaging a stop on a trolling line, an A-shaped bridle pivoted to said body having a line-engaging eye at its apex, means on said bridle for engaging a bight in the trolling line, and friction line-grip means associated with said bridle.

9. A trolling device comprising a body portion having a rear U-shaped slot, a line stop adjacent the forward end of said slot for engaging a stop on a trolling line, an A-shaped bridle pivoted to said body having a line-engaging eye at its apex, means on said bridle for engaging a bight in the trolling line, and friction line-grip means associated with said bridle.

10. A trolling device comprising a body portion having a rear V-shaped member for engaging an obstacle on a trolling line, a line-engaging bail on said body portion, an A-shaped bridle pivoted to said body having a line-engaging eye at its apex, means on said bridle for engaging a bight in the trolling line, and friction line-grip means associated with said bridle.

11. A trolling device comprising a body portion having a rear line stop for engaging an obstacle on a trolling line, an A-shaped bridle pivoted to said body and comprising a pair of converging legs and a cross-bar between said legs and having a line-engaging eye at its apex, means on said cross-bar for engaging a bight in the trolling line, and friction line-grip means associated with said bridle.

12. A trolling device comprising a body portion provided with a rear line stop plate having a V-shaped opening for engaging an obstacle on a trolling line, an A-shaped bridle pivoted to said body and having a line-engaging eye at its apex, means on said bridle for engaging a bight in the trolling line, and friction line-grip means associated with said bridle.

13. A trolling device comprising a body portion having a rear line stop for engaging an obstacle on a trolling line, an A-shaped bridle pivoted to said body and having a line-engaging loop at its apex, means on said bridle for engaging a bight in the trolling line, and friction line-grip means associated with said bridle.

14. A trolling device comprising a transversely curved ovate body portion having a rear line stop for engaging an obstacle on a trolling line, an A-shaped bridle pivoted to said body and having a loop adjacent its apex, means on said bridle for engaging a bight in the trolling line, and friction line-grip means associated with said bridle.

CLISSOLDE L. LOUTHAN.